(12) United States Patent
Rist

(10) Patent No.: US 12,459,289 B2
(45) Date of Patent: Nov. 4, 2025

(54) USER-CONFIGURABLE MOUNTING SYSTEM

(71) Applicant: Custom Range Fabrication LLC, Carlton, OR (US)

(72) Inventor: Mathew Douglas Rist, Yamhill, OR (US)

(73) Assignee: Custom Range Fabrication LLC, Carlton, OR (US)

( * ) Notice: Subject to any disclaimer, the term of this patent is extended or adjusted under 35 U.S.C. 154(b) by 100 days.

(21) Appl. No.: 18/320,416

(22) Filed: May 19, 2023

(65) Prior Publication Data

US 2024/0383273 A1 Nov. 21, 2024

(51) Int. Cl.
| | |
|---|---|
| B44C 5/02 | (2006.01) |
| F16M 11/10 | (2006.01) |
| F16M 11/20 | (2006.01) |
| F16M 13/02 | (2006.01) |
| F16M 11/00 | (2006.01) |
| F16M 11/02 | (2006.01) |
| F16M 11/04 | (2006.01) |

(52) U.S. Cl.
CPC .............. *B44C 5/02* (2013.01); *F16M 11/105* (2013.01); *F16M 11/2064* (2013.01); *F16M 13/02* (2013.01); *F16M 11/00* (2013.01); *F16M 11/02* (2013.01); *F16M 11/04* (2013.01); *F16M 2200/066* (2013.01)

(58) Field of Classification Search
CPC ........ G09B 23/36; B44C 5/02; F16M 11/105; F16M 11/2064; F16M 11/00; F16M 11/02; F16M 11/04; F16M 13/02; F16M 2200/066
See application file for complete search history.

(56) References Cited

U.S. PATENT DOCUMENTS

| | | | | |
|---|---|---|---|---|
| 3,428,306 | A * | 2/1969 | Harrison | B25B 5/147 81/118 |
| 4,971,865 | A * | 11/1990 | Nowlan | B44C 5/02 434/296 |
| 8,459,601 | B2 | 6/2013 | Shaw | |
| 9,428,003 | B2 * | 8/2016 | Gill, Jr. | B44C 5/02 |
| 9,610,798 | B2 * | 4/2017 | Allred | B44C 5/02 |
| 9,626,881 | B1 * | 4/2017 | Herron | B44C 5/02 |
| 9,993,107 | B2 | 6/2018 | Blanc et al. | |

(Continued)

*Primary Examiner* — Eret C McNichols
(74) *Attorney, Agent, or Firm* — Berkeley Law & Technology Group, LLP

(57) ABSTRACT

Example implementations relating to mounting assemblies are disclosed herein, including in one example a skull mount having a substantially longitudinal bracing member and an engaging member comprising a curved portion configured to engage a portion of an animal skull such as a base of the brain cavity. One or more adjusting members adjustably position and secure the bracing member and the engaging member to securely engage and retain a skull of an animal therebetween by engaging the curved portion of the engaging member with at least a portion of the skull such as the brain cavity. A base assembly attached to a mounting surface is coupled to a connecting assembly removably coupling the bracing member and engaging member assembly to the base assembly, the connecting assembly comprising a pivot rod and a sleeve configured to receive and removably retain the pivot rod.

20 Claims, 5 Drawing Sheets

(56) References Cited

U.S. PATENT DOCUMENTS

| | | | |
|---|---|---|---|
| 10,242,599 B1* | 3/2019 | Herron | G09B 23/36 |
| 10,400,950 B1* | 9/2019 | Hauser | F16M 13/02 |
| 10,717,317 B2* | 7/2020 | Nobi | B44C 5/02 |
| 11,440,340 B2* | 9/2022 | Psaila | B44C 5/02 |
| 11,441,728 B2* | 9/2022 | Kiser | F16M 13/022 |
| 11,535,051 B2* | 12/2022 | Eads | B44C 5/06 |
| 2011/0036959 A1* | 2/2011 | Raby | G09B 23/36 |
| | | | 248/282.1 |
| 2018/0187704 A1* | 7/2018 | Chang | F16M 11/12 |

\* cited by examiner

USER-CONFIGURABLE MOUNTING SYSTEM

FIELD

The field relates generally to mounts, and more specifically to an improved user-configurable mounting system such as for an animal skull.

BACKGROUND

People who hunt and fish do so for a variety of reasons, including providing food, maintaining tradition, and engaging in a challenging sport. Hunting provides an opportunity to engage with nature, to interact with friends with similar interests, and to celebrate the success of harvesting an animal. Most hunters prepare and consume the meat of the harvested animal, and many hunters retain a part of the animal such as antlers, a head, or a skull as a memento of a successful hunt. Such retained parts are also often put on display, such as in a family room, office, or hunting lodge, both as a remembrance of the hunting experience and as décor that embraces the hunting lifestyle.

Mounting and displaying parts of a harvested animal, such as a fish body, antlers, an elk head, or a deer skull often requires special skill in preparation and mounting. Taxidermists specialize in stabilizing and preserving body parts of harvested animals, and modifying them to be mounted such as on a wall plaque or other suitable means of presentation. The hunter will sometimes be able to specify a pose, such as a fish being posed in a swimming motion or a deer head looking slightly to one side, which the taxidermist takes into account when mounting and fixing the animal or animal parts to the mount. Deer skulls are similarly often mounted in one of a few fixed positions, such as flat to the wall (as if the deer was looking down), horizontal (as if the deer were looking forward), or at a downward angle somewhere in between. Such mounts face the challenge of presenting the skull in a decorative manner while not overshadowing the skull, such as by screwing the skull to an overly large mounting plate that detracts from the presentation.

Because deer skulls and similar animal skulls have fewer features than a deer head or fish prepared through taxidermy, presenting the skulls in an interesting and engaging manner can be difficult. The need to engage a taxidermist or similar artisan to re-mount a skull into a different configuration or position further complicates and adds expense to deciding to change the way in which a mounted skull is presented. For reasons such as these, for example, a need exists for an improved animal skull mount.

SUMMARY

An example embodiment may comprise a skull mount having a bracing member having a substantially longitudinal body, and an engaging member an engaging end comprising a curved portion longitudinally curved with respect to a plane and the engaging end extending substantially longitudinally in the plane. One or more adjusting members may adjustably secure the bracing member and the engaging member by biasing the bracing member and the engaging member relative to one another, such that the bracing member and the engaging member are further operable to cooperate via the one or more adjusting members to securely engage and retain a skull of an animal therebetween by engaging the curved portion of the engaging member with at least a portion of the skull.

In another example embodiment, a mounting system may include a holder assembly operable to securely hold a mounted item, a base assembly operable to securely attach to a mounting surface, and a connecting assembly removably coupling the holder assembly to the base assembly, the connecting assembly comprising a pivot rod and a sleeve configured to receive and removably retain the pivot rod.

In a further example embodiment, a skull mount assembly may comprise a bracing member having a substantially longitudinal body extending in a first plane and having a first biasing end and a first engaging end, and an engaging member having a second biasing end and a second engaging end. The second engaging end comprising a curved portion longitudinally curved with respect to a second plane and the second biasing end extends substantially longitudinally in the second plane. One or more adjusting members adjustably secure the bracing member and the engaging member by engaging the bracing member and the engaging member, such that the one or more adjustable members are further operable to cooperate via the one or more adjusting members securely engage and retain a skull of an animal therebetween by engaging the curved portion of the engaging member with at least a portion of the skull. A base securely attaches to a mounting surface, and a connecting assembly removably couples the holder assembly to the base assembly, the connecting assembly comprising a pivot rod and a sleeve configured to receive and removably retain the pivot rod.

The details of one or more examples are set forth in the accompanying drawings and the description below. Other features and advantages will be apparent from the description and drawings, and from the claims.

Figure 1:
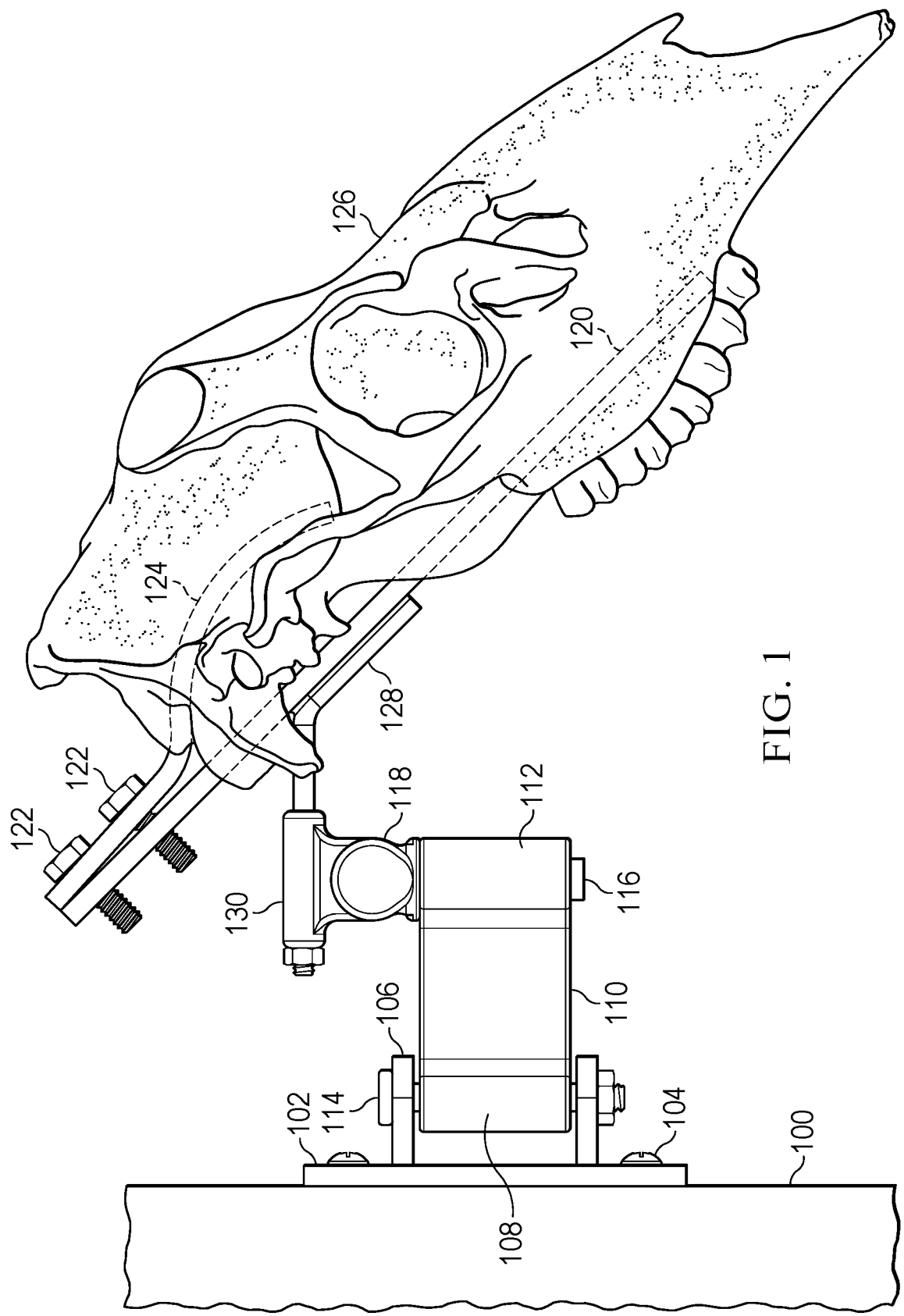
FIG. 1 is a side view of a skull mount, consistent with an example embodiment.

The drawings are provided to aid in understanding the various examples provided in the specification, and do not limit the scope of the claims or their equivalents. Not all drawings are to scale, and some parts or features may be omitted or magnified to better illustrate certain features of the examples shown.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to aid in understanding these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As discussed in the background, mounting parts of a harvested animal, such as, for example, a deer skull or similar skull, often helps a hunter remember a successful hunt and decorate their home, office, or other space with décor that reflects their interests and lifestyle. Although some animal trophies such as a deer head or fish are typically prepared by a taxidermist to appear lifelike in a fixed pose or position, other trophies such as antlers or skulls are often permanently mounted in one of a few fixed positions to a plaque which is then hung on the wall. Presenting an animal skull in particular is often limited to being fixed vertically to a wall-mounted plaque (as though the animal were looking down), or affixed horizontally or at an angle to a platform affixed to the plaque such as where the animal is looking out or at a downward angle. Mounts such as these can overshadow the skull, such as where the mounting plate is large or protrudes from the wall with the skull. Further, such skull mounts may not be user-configurable, and the skull typically often must be attached to a different mount to present the skull in a different way.

Some example implementations presented herein may provide an improved mount and one or more related assemblies that may be used, in whole or in part, for mounting animal skulls, among other items. For example, in an implementation, a skull mount may include a bracing member and a clamping member that may be linked by one or more adjusting members, which may be operable to engage and retain an animal skull. As also discussed below, a bracing member may have a substantially longitudinal body, such as, for example, a flat bar piece of metal, that has a biasing end and an engaging end. A clamping member may have a substantially longitudinal portion along a plane on a biasing end and a curved portion on an engaging end, such that the curved portion deviates from the plane. One or more adjusting members may be operable to adjustably secure a bracing member and a clamping member by engaging the bracing member and the clamping member to secure them relative to one another. A bracing member and a clamping member may be further operable to cooperate via one or more adjusting members to securely engage and retain a skull of an animal therebetween, such as, for example, by engaging a curved portion of the clamping member with at least a portion of the skull. As will also be seen in n a more detailed example below, a curved portion of an engaging member may be inserted in a brain stem cavity (or foramen magnum) of a skull so as to engage a base of the skull's cranial cavity, and a bracing member may engage a bottom portion of the skull, such that the skull is securely retained (e.g. pinched) between the engaging member and the bracing member by adjusting the one or more adjusting members.

In another example embodiment, a mounting system may include a holder assembly such as the skull mount described above, and a base assembly operable to attach to a mounting surface such as a wall, a ceiling, or a desk. A connecting assembly comprising a pivot rod and a sleeve configured to receive and removably retain the pivot rod removably couple the holder assembly to the base assembly, such that the holder assembly can be easily removed from the base assembly or repositioned about the axis of the pivot rod and sleeve.

FIG. 1 is a side view of a skull mount, consistent with an example embodiment. Here, a wall 100 has a bracket 102 affixed to it with one or more screws 104. Bracket 102 may be attached to a pair of bracket arms 106, which may support an adjustable arm made of a sleeve 108, an arm body 110, and a sleeve 112. Sleeve 108 is held in position relative to bracket arms 106 by a pin 114, and sleeve 112 supports a rotating support member 118 via a pin 116 that is connected to the rotating support member. Pins 116 and 104 enable arm 110 to be positioned in various configurations extending radially from an axis of pin 114.

Rotating support member 118 is attached to sleeve 130, which is configured to retain a mounting pin 128 that is coupled to bracing member 120. The bracing member 120 is attached through adjusting elements such as a pair of screws 122 to an engaging member 124. Screws 122 are operable to adjust the position of the engaging member 124 relative to bracing member 122 to retain an animal skull 126, such as by using bracing member 122 to support the bottom portion of the animal skull, for example, while inserting engaging member 124 through the skull's brain stem opening (or foramen magnum) to engage the bottom of the cranial cavity. Engaging member 124 in this example has a curved portion on the end inserted into the animal skull 126, that may enable pressure applied to the engaging member via screws 122 to be applied to the base of the cranial cavity, such as, for example, by reaching over a hump in the brain stem opening and brain cavity to engage the cranial cavity in a desired location or across a range of the cranial cavity. In a further example, the curved shape of the engaging member 124 engages with a corresponding bump in the brain stem opening and base of the brain cavity, helping retain the skull on the skull mount assembly.

In another example, the adjusting member 122 may comprise another mechanism operable to bias the engaging member 124 relative to the bracing member 120, such as a leaf spring attached to both the engaging member and the bracing member, an elastic adjusting member configured to pull the engaging member and the bracing member together, or another such biasing or adjusting mechanism. The bracing member 120 and the biasing member may be constructed of flat bar steel in this example, but in other examples may be wood, plastic or composite, or any other material suitably strong to engage and retain an animal skull.

In a further example, at least one of the bracing member 120 and the engaging member 124 may be modified where it engages with the skull to provide better retention, such as by adding texture to the bracing and/or engaging member's surfaces in the region of skull contact, or by adding a material with higher friction than flat bar steel such as grip tape to at least one of these regions. In another example, a resilient material such as an elastomer may be added to the regions of at least one of the bracing member 120 and the engaging member 124 where it engages with the skull, providing benefits such as improved contact area, improved friction, and improved clamping force between the skull and the bracing/engaging members. In a more detailed example, a rubber or silicone pad may be applied to the skull contact areas of the bracing and engaging members to provide for improved friction between the skull and the skull mount assembly, to reduce the risk of the skull mount assembly damaging the skull, and to distribute a greater clamping force over a wider area of the skull than would be achieved without the use of such a pad.

In operation, a skull mount user decides where the skull mount is to be mounted, such as to a wall 100 or other stable surface, and positions bracket 102 in the desired location. Screws 104 or other suitable fasteners such as lag bolts, adhesive, or the like are used to secure the bracket 102 to the wall 101. The bracket in some examples is preassembled to some degree, such as where the adjustable arm made of sleeve 108, arm body 110, and sleeve 112 is preassembled to bracket arms 106 by a pin 114 that connects the bracket arms 106 to sleeve 108 by passing through holes in both the bracket arms and the sleeve. In a further example, pin 114 may be held into place either permanently, such as by flared ends on both ends of the pin, or removably such as by a nut, retaining pin, or retaining clip on at least one end of the pin.

The skull mount user also mounts the skull 126 between the bracing member 120 and the engaging member 124 by loosening one or more adjusting members such as screws 122, enabling the engaging member to be inserted into the brainstem opening of the skull while the bracing member is positioned along the bottom of the skull to brace and support the skull. The bracing member 120 and the engaging member 124 in FIG. 1 may each have a biasing end where adjustable biasing members 122 are attached, and an engaging end where the bracing member and engaging members contact the skull to support and retain the mounted skull. The biasing end and engaging end in this example are not limited to the very ends or tips of the bracing and engaging members, but are simply regions of the bracing and engaging members that perform different functions and that are located near or extend well away from the tips or ends of the respective members in various embodiments. The bracing member 120 and engaging member 124 may be adjusted in distance relative to one another, including both at the engaging end and at the biasing end separately, by adjusting the pair of screws employed as adjusting members 122 in this example. In other examples, such as where adjusting member 122 comprises a spring or an elastomer, the distance between the biasing member 120 and engaging member 124 may not be adjustable at the biasing end but may be adjusted at the engaging end by pulling the engaging end of the biasing member and engaging member apart to insert the engaging member 124 into the skull 126 to engage and retain the skull.

The engaging member 124 may be configured in a further example with a curved portion on the engaging end of the engaging member to accommodate the skull anatomy of one or more types of animal, such as various species of deer including whitetail deer, mule deer, caribou, elk, and the like. In other examples, different skull mounts may be configured for different animals having various skull configurations and sizes, such as one model of skull mount for mule deer and whitetail deer, another skull mount for caribou and elk, and a larger skull mount for moose. The skull mount in a further example may include models or configurations adapted to different types of animals, such as bear, mountain lions, pronghorn goats, bighorn sheep, and other such game animals. The curved portion in the example engaging member shown at 122 may be specifically configured to enter through the brain stem opening in the back of a deer skull, and to engage the base of the skull's brain cavity when the skull is pinched or engaged between the bracing member 120 and the engaging member 122 by adjusting the adjusting members shown as screws at 122.

The bracing member 120 may be attached to rotating support member 118, which may be rotatably attached to pin 116 that is configured to be received in the sleeve 112 of the bracket arm assembly. The rotating support member 118 in this example is operable to rotate about an axis perpendicular to the side view shown, such that the bracing member 120 may rotate up and down to configure whether the mounted skull is looking forward, up, or down. The position of the rotating support member 118 may be fixed by a mechanism such as friction or by adjustable retention such as set screw, pinch collar, or teeth in moving elements comprising part of the rotating support member. Rotating support members may also be lubricated to prevent wear between contact points, such as by lubricating pins such as 116, 114, and/or 128, lubricating sleeves such as 108, 112, and/or 130, and/or lubricating support member 118. Lubrication in various examples may include oil, grease, plastic or polymer washers, or other materials introduced to reduce friction and/or wear between elements of the skull mount. In further examples, additional pivots or rotating support members may be provided, such as to enable the skull to tilt from side to side such that one ear appears lower than the other ear when mounted.

The pin 116 may be held in sleeve 112 by friction and/or gravity in this example, and may be rotatable such that the skull 126 can be positioned to be looking straight away from the wall 100, or to the right or to the left. In a further example, the pin 116 may be adjustably retained in position in sleeve 112, such as by using a set screw, pinch collar, or teeth to adjust or fix the position or degree of friction of the pin 116 and sleeve 112. In the example shown in FIG. 1, the elements attached to the skull can be removed from sleeve 112 by lifting the assembly comprising the skull 126, bracing member 120, engaging member 124, rotating support member 118, and pin 16 up and away from sleeve 112, facilitating easy removal and reconfiguration of the skull mount. For example, a user can remove the skull and elements attached to the skull to clean the skull, or to place the skull and attached elements on another sleeve 112 that is part of a different assembly attached to the wall in a different location. Reconfiguring presentation of a display including several skulls and skull mounts is therefore simplified, and does not necessarily require unscrewing the bracket 102 from the wall 100 to move the skull to a different location if other bracket assemblies are available.

The skull mount shown in FIG. 1 provides several advantages over prior methods such as screwing or attaching the skull to a fixed mount such as a piece of wood attached to a bracket that can be hung on or screwed to the wall. The example shown here provides for easy repositioning and configuring the skull, such as being able to move the skull toward or away from the wall or shifting the skull left to right by adjusting the position of bracket arm 110, adjusting whether the skull 126 is looking up or down by adjusting rotating support member 118, and adjusting whether the skull is facing left, right, or straight by adjusting the position of pin 116 in sleeve 112. The mounted skull can also be easily moved from one location to another by using different mounting bracket assemblies (elements 102-114) to receive different mounted skull assemblies (elements 116-126), including moving the mounted skull assemblies to assemblies other than the bracket assembly such as a chandelier base or desk base comprising a suitable sleeve 112.

The skull mount of FIG. 1 further improves upon prior skull mounts by engaging the skull 126 in a manner that does not require using screws, adhesive, or other such potentially damaging elements to engage and retain the skull. The engaging member 124 in the example of FIG. 1 may have a curved portion that is specifically configured to enter the brain stem opening at the rear of an animal skull, to curve around the contour of the skull where the brain stem exits the brain cavity of the skull, and to engage the base of the brain cavity in the skull. The length, curve, and other characteristics of the engaging member are configured in some examples for specific animals or for different-sized animals, such as whitetail deer, mule deer, elk, caribou, moose, bear, mountain lions, pronghorn goats, and bighorn sheep. Animal skulls such as these can be easily affixed to the mount shown by using adjusting members 122 shown as screws in FIG. 1 to adjust both the distance between the engaging member 124 and bracing member 120 and the distance between the engaging ends of engaging member 124 and bracing member 120.

Although the example of FIG. 1 shows use of the mounting bracket assembly (elements 102-114) to receive a mounted skull assembly (elements 116-126), other examples may be used to mount other objects, such as an electronic device like an iPad or other tablet computer, a chart plotter or fish finder, a television or computer display screen, or any other device that a user wishes to mount. The mounted skull assembly (elements 116-126) in such embodiments may vary such that at least part of the engaging member 124 and bracing member 120 are replaced with other elements to suitably engage the desired electronic device or other mounted item, enabling the mounted item to be easily repositioned and removed as described in the above examples.

Figure 2:
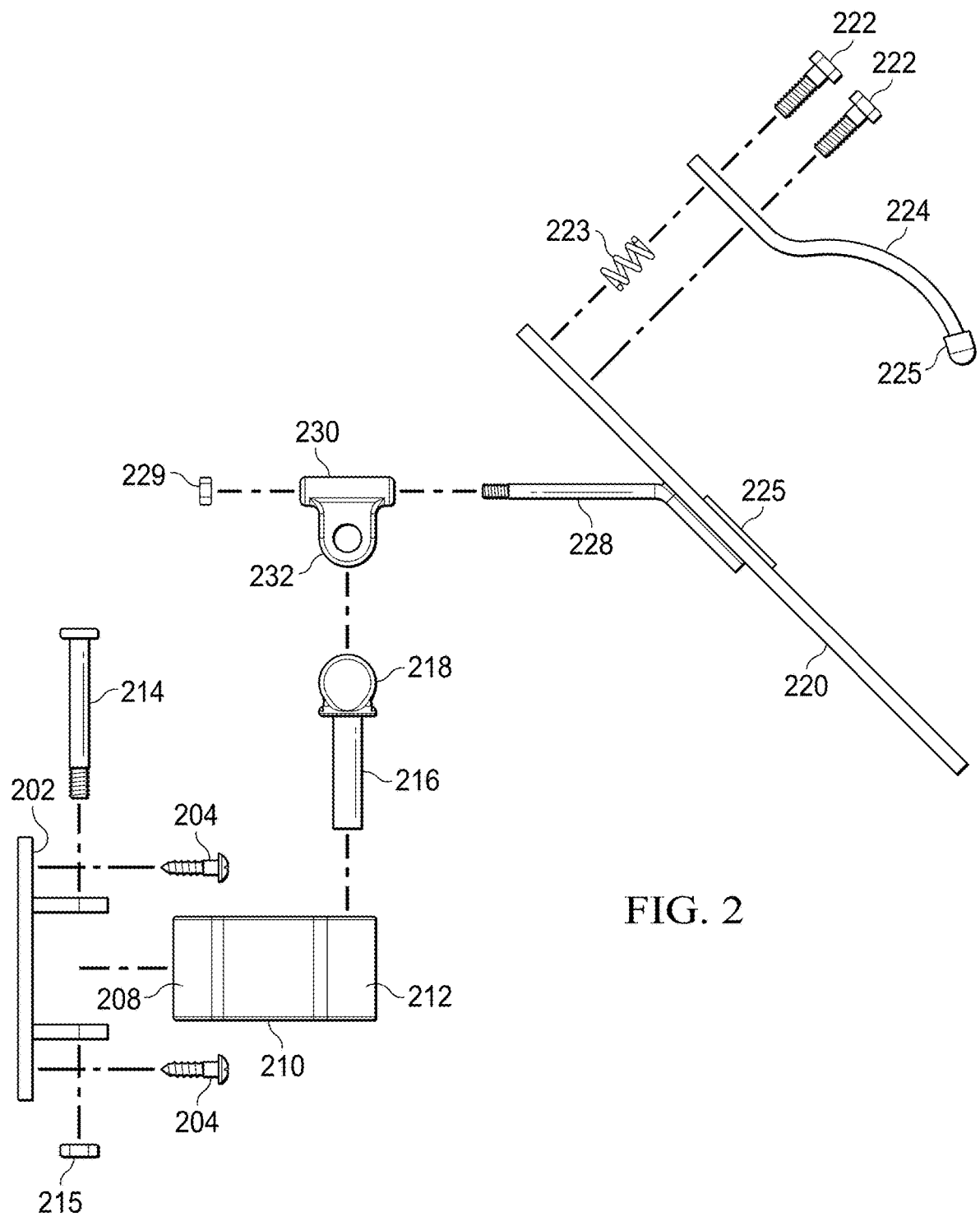
FIG. 2 is an exploded diagram of a skull mount, consistent with an example embodiment.

FIG. 2 is an exploded diagram of a skull mount, consistent with an example embodiment. The exploded view is provided to show each part individually to better understand assembly and operation of the skull mount, and the last two digits of element numbers generally correspond to the last two digits of numbers for the same element in FIG. 1.

As shown in FIG. 2, a bracket 202 may be configured to be mounted to a surface such as a wall using one or more screws 204. In other examples, lag bolts, adhesives, or other fasteners are employed instead of or in conjunction with the shown screws. The bracket may be attached to bracket arms 206, which may have holes drilled in them to receive pin 214 once sleeve 208 is positioned between the bracket arms 206 such that a hole in sleeve 208 aligns with the holes in the bracket arms. A clip, nut, or other fastener or retention element 215 may be provided in a further example to retain pin 214 in the holes in the bracket arms 206 and sleeve 208, while in other examples pin 214 may comprise a bolt or another suitable element for coupling bracket arms 206 to sleeve 208.

Arm body 210 may link sleeve 208 to sleeve 212, and a hole in sleeve 212 may be configured to receive pin 216, which in turn may support rotating support member 218. The rotating support member 218 may be configured to interface with and cooperate with rotating support member 232, such as where one element comprises a metal rod and the other element comprises a sleeve configured to receive the rod. As described in conjunction with the example of FIG. 1, the rotating support member made up of elements 218 and 232 may be configured to be fixed into position once the desired position is obtained, such as by using a locking collar, a set screw, engaging teeth on rotating support member elements 218 and 232, or other suitable means. In a further example, the pin 216 may be removable from sleeve 212 by lifting it up, and is retained by at least one of friction and gravity. The pin 216 in some further examples may also be lockable into a desired position by use of a locking collar, a set screw, engaging teeth, or other such means.

Bracing member 220 in the example of FIG. 2 may be coupled to engaging member 224 by adjusting members 222, which are shown here as a pair of adjustable screws that are threaded into the bracing member 220. The engaging member in this example may also have an adjusting portion where the adjustable screws are located and an engaging portion that is curved and is configured to enter the brain stem opening of a skull and engage the skull at the base of the brain cavity and/or the brain stem opening. Engaging member 224 may in some examples be biased with respect to bracing member 220 by one or more springs 223, such as to bias the engaging member and bracing member together in the engaging portion of the engaging member. The engaging portions of the bracing member, the engaging member, or a combination thereof, may also be attached to one or more resilient members 225, such as a rubber pad or other such cushioning element, such that while the skull of an animal is mounted the skull contacts the one or more resilient members which may protect the skull from damage.

The bracing member may be affixed to a pin 228 that is configured to be received in a sleeve 230 and may be retained by a nut, clip, or other fastener 229, and/or in alternate embodiments by a set screw, pinch collar, engaging teeth, or similar retention mechanism. The pin 228 and the sleeve 230 enable the bracing member 220 and engaging member 224 to rotate in such a way that a mounted skull tips side to side as though its ears were rising and falling relative to one another. This additional degree of movement enables additional posing opportunities when setting up the skull mount, providing a more life-like range of skull positioning when displaying an animal skull.

Figure 3:
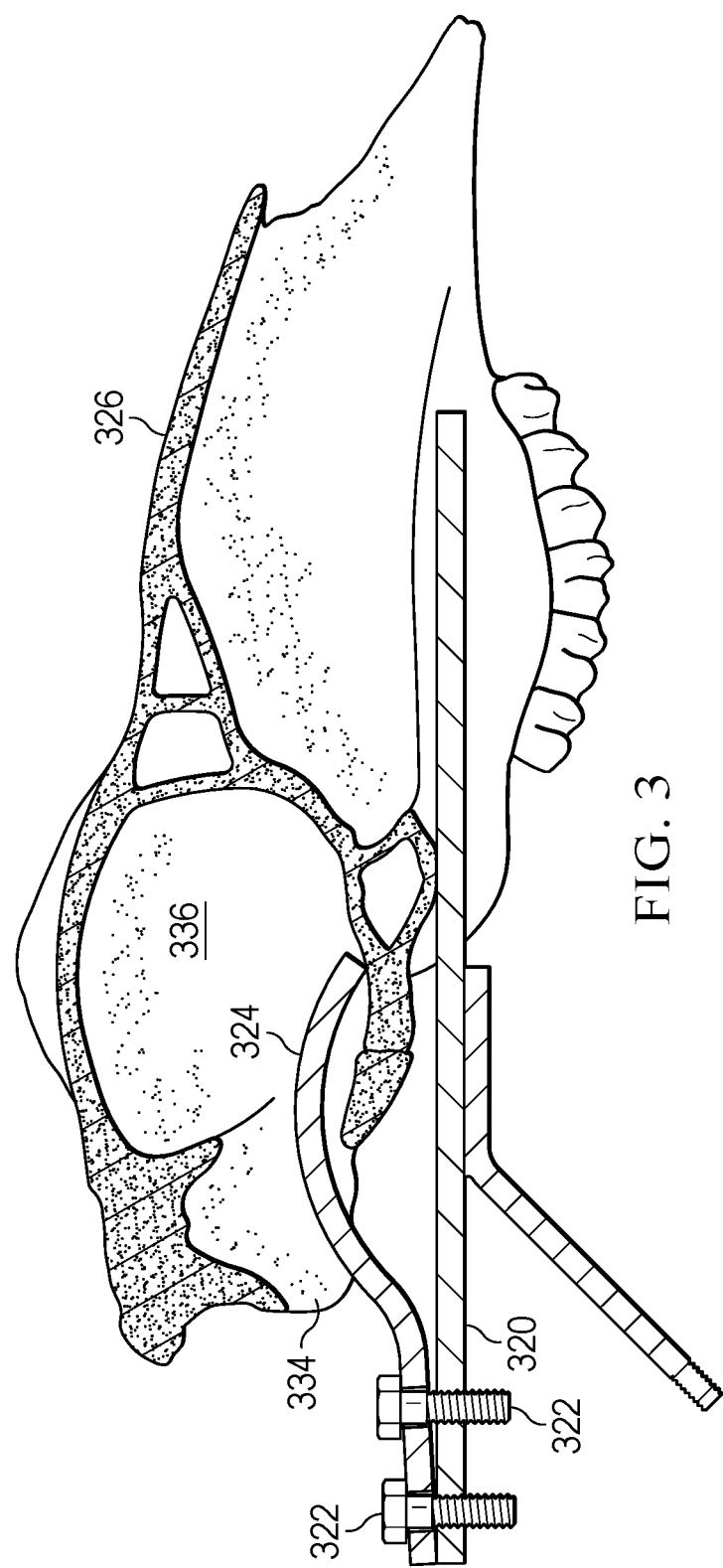
FIG. 3 is a cross section of an animal skull with a bracing member and elongated member engaging and retaining the skull, consistent with an example embodiment.

FIG. 3 is a cross section of an animal skull with a bracing member and elongated member engaging and retaining the skull, consistent with an example embodiment. Here, bracing member 320 may rest along the bottom of the skull, in contact with the roof of the skull's mouth and with a bone in the rear of the skull (occipital bone), thereby supporting the skull. Screws 322, or another suitable adjusting member may link the bracing member 320 to engaging member 324. The engaging member in this example may have a substantially straight portion where the screws pass through unthreaded holes and engage threaded holes in the bracing member 320 to facilitate adjustment of the position of the engaging member relative to the bracing member and to securely engage and retain the skull. The engaging member 324 may also have a curved portion configured to enter the skull through the brain stem opening (foramen major) shown at 334, and to engage the skull at the base of the brain cavity as shown at 336.

The shape of the engaging member may be somewhat dependent on the shape of the brain stem opening, the shape of the brain cavity, and the size of the skull to properly engage and retain the skull. Different curves and different sizes of engaging member 324 are therefore provided in further examples for different animal skulls of different sizes and different geometric configurations, such as for whitetail deer, mule deer, elk, caribou, moose, bear, mountain lions, pronghorn goats, and bighorn sheep. In some such examples, some engaging members may work for multiple species of animals having similar size and geometry skulls, such as whitetail deer, mule deer, and caribou. In other examples, specialized engaging members may be provided for more unique game animals such as for mountain lion skulls or for bear skulls.

The engaging member 324 in this example makes contact with a portion of the skull base near the engaging end of the engaging member, but in other examples may make contact with a skull in a different location on the curved portion such as in the middle of the curved portion. In another example, at least a portion of the engaging member 324 and/or the bracing member 320 may be textured to better retain the skull, such as by engraving a texture into contact surfaces of the engaging member and/or the bracing member. In another example, a material with high friction such as grip tape may be applied to at least one contact region on the engaging member and/or bracing member, or a resilient material such as an elastomer may be added to at least one contact region of the bracing member and/or engaging member where they engage with the skull. Applying a resilient material to areas where parts of the skull mount contact the skull may provide benefits such as improved contact area, improved friction, and improved clamping force between the skull and the bracing/engaging members. The resilient material in more detailed examples may comprise a rubber or silicone pad applied to contact areas to increase friction between the skull and the skull mount assembly, to reduce the risk of the skull mount assembly damaging the skull, and to distribute clamping force over a wider area of the skull than would be achieved without the use of such a resilient material.

Figure 4:
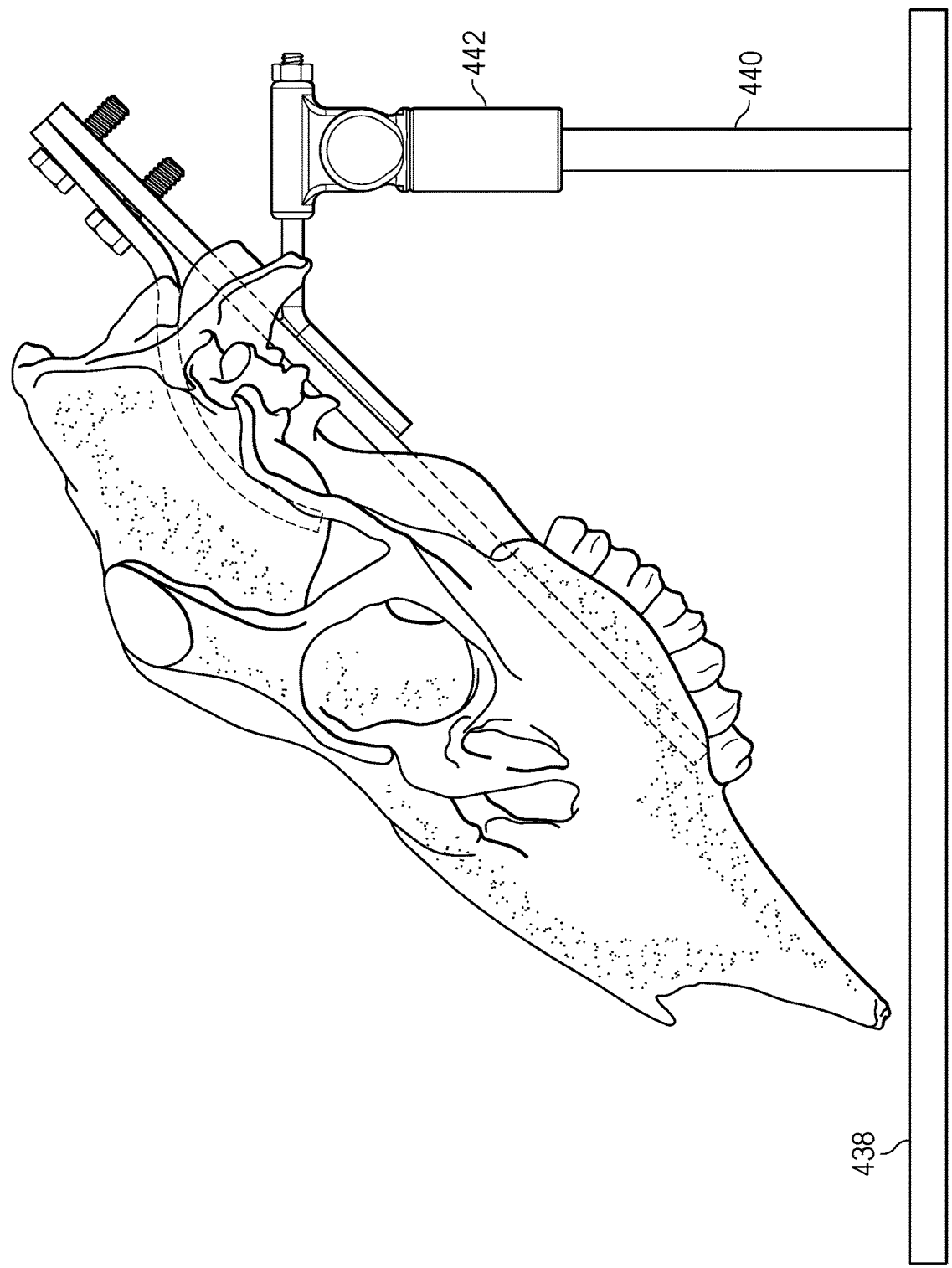
FIG. 4 is a side view of a skull mount for a desk, consistent with an example embodiment.

FIG. 4 is a side view of a skull mount for a desk, consistent with an example embodiment. A base 438 may support an elevating shaft 440 that in turn may support a sleeve 442, which may be configured to receive a skull mount assembly having a pin such as pin 116 of FIG. 1. The skull mount assembly of FIG. 1 shown at 116-126 may be inserted into the base assembly's sleeve 442 by placing pin 116 in sleeve 442, and the base 438, elevating shaft, 440, and sleeve 442 may work together to support and position the skull mount assembly. The skull mount assembly may be rotated in the base assembly's sleeve 442, and tilted up and down as in the example of FIG. 1. In a further example, the elevating shaft 440 may be adjustable, such that the distance between the skull and the base can be varied. In another example, additional degrees of freedom such as provided by pin 228 and sleeve 230 to enable the skull to tilt side to side may be employed in the skull mount assembly.

Figure 5:
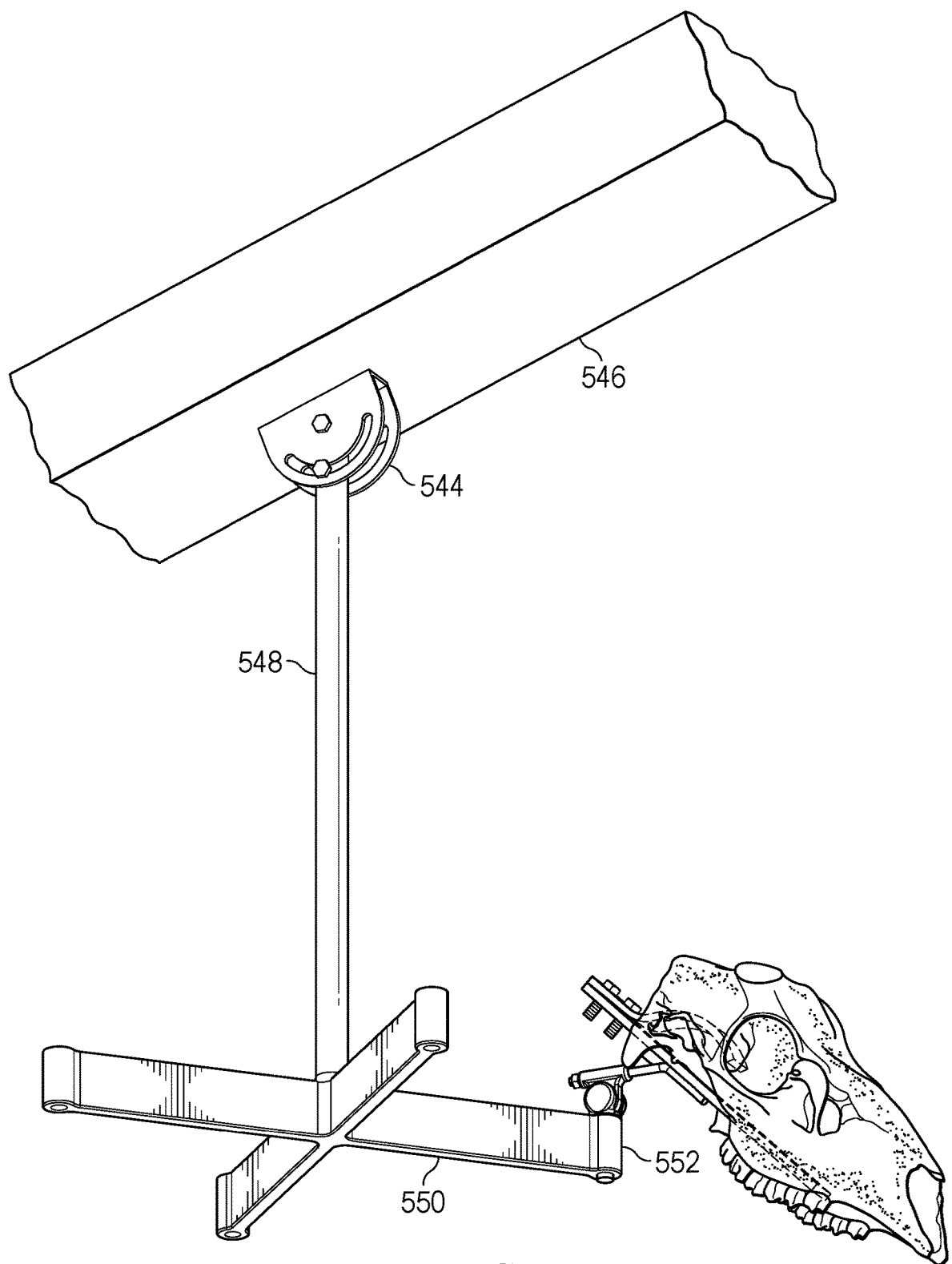
FIG. 5 is a side view of a skull mount chandelier, consistent with an example embodiment.

FIG. 5 is a side view of a skull mount chandelier, consistent with an example embodiment. Here, an articulating ceiling mount 544 may be attached to the ceiling 546 of a building such as a cabin, lodge, or office, and supports a pole 548. The pole 548 may support one or more arms 550 attached at one end to the pole 548 and having a sleeve 552 on the opposite end. As with the desk mount example of FIG. 4, the sleeve 552 may be operable to receive a skull mount assembly having a pin such as pin 116 of the skull mount assembly shown at 116-126 of FIG. 1. In a further example, the chandelier may have one or more lights attached, such as attached to arms 550 or pole 548. The lights are in some examples may be further configured to illuminate a mounted skull, such as being supported by pole 548 and shining down on the skull from above.

A user wishing to use the chandelier skull mount of FIG. 5 may choose a location for the chandelier skull mount, and may attach articulating ceiling mount 544 to the ceiling. Pole 548 may be attached to the articulating ceiling mount such as with a retaining bolt, and its position (typically vertical) may be selected by rotating the pole about the retaining bolt and securing a second bolt. The arms 550 in some examples may be permanently attached to the pole 548, but in other examples may be attached to the pole such as by bolting an arm assembly to the bottom of the pole. One or more skull mount assemblies (e.g., the skull mount assembly shown at 116-126 of FIG. 1) may then be mounted on the chandelier, such as by inserting a pin 116 of the skull mount assembly into a sleeve 552 at the end of arms 550.

The examples provided herein illustrate how a skull mount having bracing member and a clamping member with a curved portion configured to be inserted into a skull's brain stem opening to engage the skull at the bottom of the cranial cavity can be used to securely mount a skull without using screws, adhesives, or other methods to attach the skull that may damage the skull. One or more adjusting members may link the bracing member and the clamping member, and are operable to bias the bracing member and engaging member toward one another to securely engage and retain the skull.

Some examples also include a skull mount mounting portion that can be easily removed from a base portion, such as by lifting a pin out of a retaining sleeve. This may facilitate easy reconfiguration of a display of skulls, such as moving a skull from one mounting location to another or removing one skull from display and replacing it with another skull without having to re-mount the skull using the bracing member, engaging member, and adjustment members. In a further example, the skull mount mounting portion can be removed from one type of mount base, such as a wall mount, and inserted into another type of base such as a desk mount or a chandelier mount with little effort and without tools.

The skull mount examples presented here also may provide various degrees of adjustability, including tilting the skull up and down, side to side, positioning the skull to the left and to the right, and moving the skull close to the wall or further away from the wall. Some examples may not have all these degrees of freedom of adjustment, and others may have additional or other degrees of freedom or adjustment. This flexibility in adjusting the position of the mounted skull allows the position of a mounted skull to be varied to be more lifelike, to vary from skull to skull, and to be tailored to a user's preferences.

The skull mounts may further be configured in some examples to work with different types of animal skulls. In one such example, a bracing member and engaging member may be selected to work with a range of similar animal skulls, such as whitetail deer, mule deer, and caribou. In other examples, different engaging members and/or different bracing members may be provided for different animal skulls having different sizes or shapes, such as elk, moose, bear, mountain lions, pronghorn goats, and bighorn sheep. In some further examples, the skull mount mounting assemblies for different animals may use the same mounting pin, which is operable to be inserted in a common skull mount base so that skulls of different animals can be easily moved around between different bases.

Although specific embodiments have been illustrated and described herein, any arrangement that achieve the same purpose, structure, or function may be substituted for the specific embodiments shown. This application is intended to cover any adaptations or variations of the example embodiments described herein. These and other embodiments are within the scope of the following claims and their equivalents, which are not limited by the examples presented in the specification.

The invention claimed is:

1. A skull mount, comprising:
   a bracing member having a substantially longitudinal body extending in a first plane;
   an engaging member extending substantially longitudinally in a second plane comprising a curved portion longitudinally curved with respect to the second plane; and
   one or more adjusting members operable to adjustably secure the bracing member and the engaging member by biasing the bracing member and the engaging member relative to one another, such that the bracing member and the engaging member are further operable to cooperate via the one or more adjusting members to securely engage and retain a skull of an animal therebetween by engaging the curved portion of the engaging member with at least a portion of the skull, wherein the curved portion of the engaging member comprises a first bend orienting the engaging member away from the second plane and a second bend orienting the clamping member back toward the second plane.

2. The skull mount of claim 1, wherein the curved portion is shaped to fit into a foramen magnum of the skull and to retain the skull by engaging with at least a portion of a bottom of a cranial cavity of the skull.

3. The skull mount of claim 2, wherein the bracing member is biased against a bottom portion of the skull of the animal to securely engage and retain the skull of the animal between the bracing member and at least the curved portion of the engaging member.

4. The skull mount of claim 1, wherein at least one of the one or more adjusting members comprise a screw that is connected to at least one of the bracing member and the engaging member by a threaded portion configured to receive the screw in at least one of the bracing member and engaging member.

5. The skull mount of claim 4, wherein the one or more adjusting members comprise at least two screws that are operable to both adjust the distance between the bracing member and the engaging member and to adjust an angle between the first plane of the bracing member and the second plane of the engaging member.

6. The skull mount of claim 1, wherein the one or more adjusting members are operable to position the bracing member and the engaging member to securely engage and retain different-sized animal skulls.

7. The skull mount of claim 1, wherein at least one of the one or more adjusting members comprises a spring.

8. The skull mount of claim 1, further comprising one or more resilient members attached to at least one of the bracing member and the engaging member, such that while the skull of an animal is mounted the skull contacts the one or more resilient members.

9. The skull mount of claim 1, wherein at least one of the bracing member and the engaging member are formed of flat bar metal.

10. The skull mount of claim 1, further comprising at least one of a sleeve, and/or a pin, or a combination thereof, configured to cooperate with another sleeve, and/or another pin, or a combination thereof of a base to attach the skull mount to the base.

11. The skull mount of claim 1, wherein the engaging member is configured to engage the skull of the animal by inserting the curved portion of the engaging member into a foramen magnum of the skull of the animal and biasing the curved portion of the engaging member against a cranial cavity wall of the skull of the animal.

12. A skull mounting assembly, comprising:
a bracing member having a substantially longitudinal body extending in a first plane;
an engaging member extending substantially longitudinally in a second plane comprising a curved portion longitudinally curved with respect to the second plane, wherein the curved portion of the engaging member comprises a first bend orienting the engaging member away from the second plane and a second bend orienting the clamping member back toward the second plane; and
one or more adjusting members operable to adjustably secure the bracing member and the engaging member by biasing the bracing member and the engaging member relative to one another, such that the bracing member and the engaging member are further operable to cooperate via the one or more adjusting members to securely engage and retain a skull of an animal therebetween by engaging the curved portion of the engaging member with at least a portion of the skull;
a base operable to securely attach to a mounting surface; and
a connecting assembly removably coupling the holder assembly to the base assembly, the connecting assembly comprising a pivot rod and a sleeve configured to receive and removably retain the pivot rod.

13. The skull mounting assembly of claim 12, wherein the engaging member is configured to engage the skull of the animal by inserting the curved portion of the engaging member into a foramen magnum of the skull and biasing the curved portion of the engaging member against a cranial cavity wall of the skull and the bracing member against a bottom portion of the skull via the one or more adjusting members to securely engage and retain the skull.

14. The skull mounting assembly of claim 12, further comprising one or more pivot members, each operable to pivot in an axis different from an axis about which the pivot rod and pivot sleeve may pivot with respect to one another.

15. The skull mounting assembly of claim 12, wherein at least one of the one or more adjusting members comprise a screw that is connected to at least one of the bracing member and the engaging member by a threaded portion configured to receive the screw in at least one of the bracing member and engaging member.

16. The skull mounting assembly of claim 15, wherein the one or more adjusting members comprise at least two screws that are operable to both adjust the distance between the bracing member and the engaging member and to adjust an angle between the first plane of the bracing member and the second plane of the engaging member.

17. The skull mounting assembly of claim 12, wherein the one or more adjusting members are operable to position the bracing member and the engaging member to securely engage and retain different-sized animal skulls.

18. The skull mounting assembly of claim 12, further comprising one or more resilient members attached to at least one of the bracing member and the engaging member, such that while the skull of an animal is mounted the skull contacts the one or more resilient members.

19. A method of mounting a skull, comprising:
inserting a skull between an engaging member and a bracing member of a skull mount such that the bracing member has a substantially longitudinal body extending in a first plane and is in contact with a bottom portion of the skull, and the engaging member has a substantially longitudinal body extending in a second plane comprising a curved portion longitudinally curved with respect to the second plane and is in contact with at least a portion of a bottom of a cranial cavity of the skull, wherein the curved portion of the clamping member comprises a first bend orienting the engaging member away from the second plane and a second bend orienting the clamping member back toward the second plane; and adjusting one or more adjusting members to adjustably secure the bracing member and the engaging member by biasing the bracing member and the engaging member relative to one another, such that the bracing member and the engaging member are further operable to cooperate via the one or more adjusting members to securely engage and retain a skull of an animal therebetween by engaging the curved portion of the engaging member with at least a portion of the skull.

20. The method of mounting a skull of claim 19, further comprising physically coupling the engaging member, the bracing member, or a combination thereof to a wall via one or more rotating support members.

* * * * *